US008547385B2

(12) United States Patent
Jiao

(10) Patent No.: US 8,547,385 B2
(45) Date of Patent: Oct. 1, 2013

(54) SYSTEMS AND METHODS FOR PERFORMING SHARED MEMORY ACCESSES

(75) Inventor: Yang (Jeff) Jiao, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 582 days.

(21) Appl. No.: 12/905,595

(22) Filed: Oct. 15, 2010

(65) Prior Publication Data

US 2012/0092356 A1 Apr. 19, 2012

(51) Int. Cl.
*G06F 15/167* (2006.01)
*G06F 12/02* (2006.01)

(52) U.S. Cl.
USPC .......................................... 345/541; 345/543

(58) Field of Classification Search
USPC .......... 345/506, 530, 541, 543, 544; 711/153
See application file for complete search history.

(56) References Cited

U.S. PATENT DOCUMENTS 7,872,657 B1 * 1/2011 Edmondson et al. ......... 345/544
7,898,551 B2 * 3/2011 Xu et al. ....................... 345/557

* cited by examiner

*Primary Examiner* — Jacinta M Crawford
(74) *Attorney, Agent, or Firm* — McClure, Qualey & Rodack, LLP

(57) ABSTRACT

Various systems and methods are described for accessing a shared memory in a graphics processing unit (GPU). One embodiment comprises determining whether data to be read from a shared memory aligns to a boundary of the shared memory, wherein the data comprises a plurality of data blocks, and wherein the shared memory comprises a plurality of banks and a plurality of offsets. A swizzle pattern in which the data blocks are to be arranged for processing is determined. Based on whether the data aligns with a boundary of the shared memory and based on the determined swizzle pattern, an order for performing one or more wrapping functions is determined. The shared memory is accessed by performing the one or more wrapping functions and reading the data blocks to construct the data according to the swizzle pattern.

20 Claims, 14 Drawing Sheets

SYSTEMS AND METHODS FOR PERFORMING SHARED MEMORY ACCESSES

TECHNICAL FIELD

The present application relates generally to graphics pipelines in a GPU (graphics processing unit) and more particularly to systems and methods for performing shared memory accesses in a GPU.

BACKGROUND

Computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system. The purpose of texture mapping is to provide a realistic appearance on the surface of objects.

The Direct3D 11 specification from MICROSOFT® defines a new kind of shader known as a compute shader that offers such features as multi-thread support to aid in the development of such graphics-intensive applications as video games. The compute shader provides access to the computing power and bandwidth of SIMD (single instruction, multiple data) cores such as those used in graphics processors. A compute shader is invoked as multiple threads, where the threads are divided into thread groups. While synchronization operations exist to provide ordering of thread execution, such synchronization techniques may be bandwidth and memory intensive.

SUMMARY

Briefly described, one embodiment, among others, is a method for accessing a shared memory in a graphics processing unit (GPU). The method comprises determining whether data to be read from a shared memory aligns to a boundary of the shared memory, wherein the data comprises a plurality of data blocks, and wherein the shared memory comprises a plurality of banks and a plurality of offsets. The method further comprises determining a swizzle pattern in which the data blocks are to be arranged for processing. Based on whether the data aligns with a boundary of the shared memory and based on the determined swizzle pattern, an order for performing one or more wrapping functions is determined. The method further comprises accessing the shared memory by performing the one or more wrapping functions and reading the data blocks to construct the data according to the swizzle pattern.

Another embodiment is shared memory system that comprises a shared memory coupled to a compute shader and components in a graphics processing unit (GPU) pipeline, and a memory controller for determining whether data to be accessed aligns to a boundary of the shared memory. The memory controller further comprises a swizzle module for determining a pattern in which data comprising a plurality of blocks are to be arranged and a memory access module for accessing the shared memory according to the pattern, wherein the memory access module accesses the shared memory using one or more wrapping operations.

Another embodiment is a method for processing data in a shared random access memory in a graphics processing unit (GPU). The method comprises determining a pattern of data to be processed in the shared memory, wherein the data is partitioned into a plurality of slots, lanes, and strides. Based on the pattern, an order for performing one or more of: slot wraps, lane wraps, and stride wraps is determined. The method further comprises performing the one or more slot wraps, lane wraps, and stride wraps according to the order.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
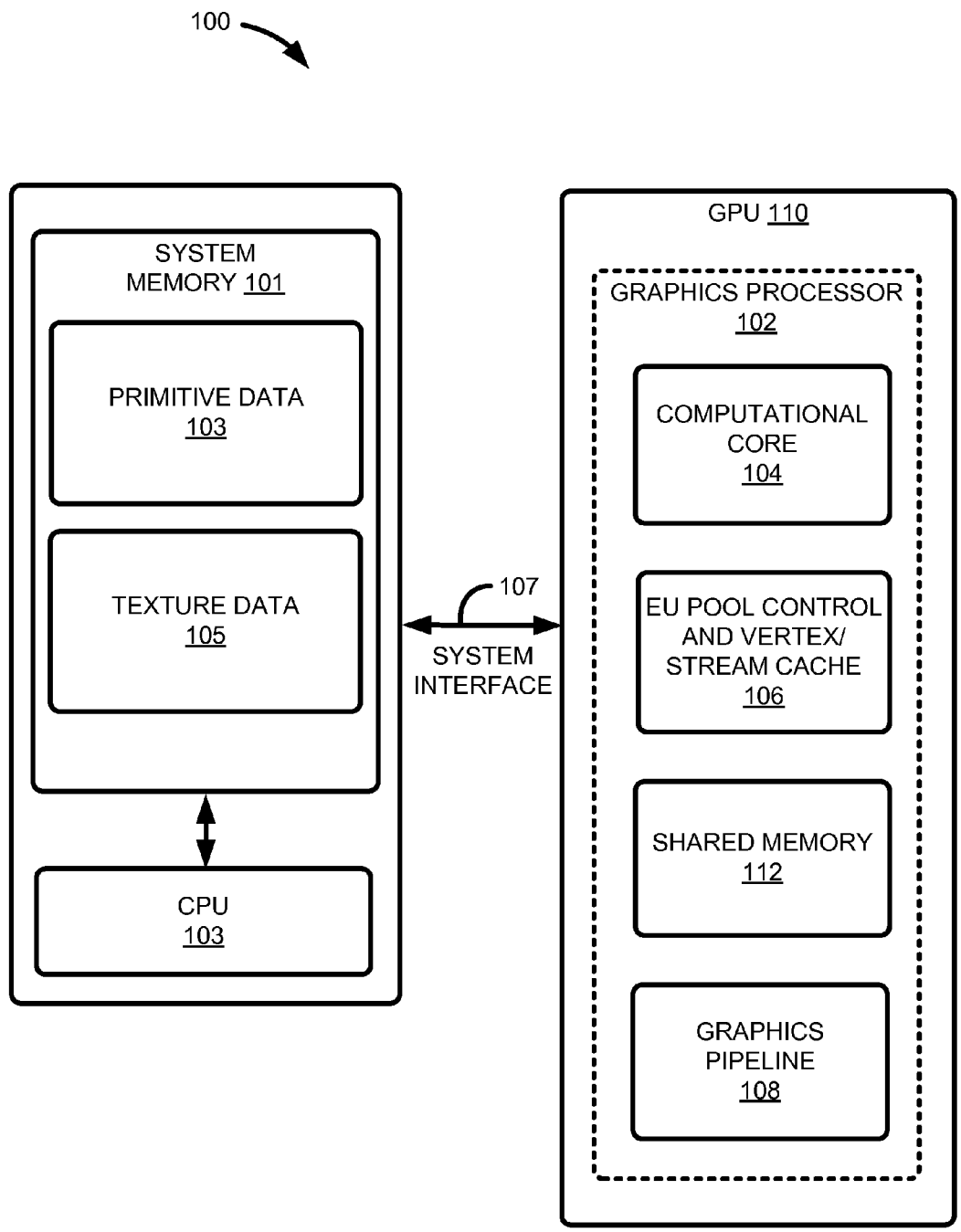
FIG. 1 is a functional block diagram illustrating a graphics system in which embodiments of a shared memory are implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

One perceived shortcoming with conventional approaches to accessing a shared memory in a graphics pipeline is that accessing nonaligned data may require multiple memory access cycles as the blocks of data are typically retrieved one by one to construct the requested block. Systems and methods of accessing a shared memory for thread execution in a graphics pipeline are described which provide flexibility in accessing and manipulating data of variable size stored across multiple lanes within a shared memory in a graphics processing unit (GPU), while reducing the number of required memory cycles. Exemplary embodiments of a shared memory system are configured for memory read/write operations during thread execution and comprise a random access memory (RAM) partitioned into a plurality of banks and offsets.

In the context of thread execution, the shared memory system described may be utilized during such operations as thread kickoff and thread synchronization. During video decoding, for example, data may need to be read and arranged according to a particular pattern such that swizzling operations may be required. Furthermore, unaligned blocks of data may be retrieved that do not align to the offset and bank boundaries or to pixel blocks arranged within the shared memory. For purposes of illustration, reference is made to FIG. 7 where a 2-dimensional array of 4×4 pixel blocks is shown. In some instances, a data block 702 to be accessed may overlap multiple 4×4 pixel blocks and is thus characterized as an unaligned block of data since the data block 702 does not fit exactly within a particular 4×4 pixel block.

In the nonlimiting example shown in FIG. 7, the unaligned 4×4 pixel block 702 may be accessed through a series of slot, lane, and stride wrap operations, which will be described later. Through the use of various shared memory access techniques described herein, unaligned data blocks of different sizes may be accessed. For example, a 16×1 block of data may be accessed, and alternatively, a 1×16 block, which spans multiple lanes, may be accessed. Through the use of memory accessing techniques described, the reading and writing of variable-sized data may be performed in an efficient manner.

Reference is now made to FIG. 1, which is a functional block diagram of a graphics platform in which embodiments of a shared memory system are implemented. In some implementations, the graphics processor system 100 may be configured as a computer system. The graphics processor system 100 includes a graphics processing unit (GPU) 110, which further comprises a graphics processor 102. The graphics processor 102 also comprises a multiple execution unit (EU), computational core 104, also known as a software programmable core processing unit, that in one embodiment, comprises a GP shader.

The graphics processor 102 also comprises an execution unit pool (EUP) control and vertex/stream cache unit 106 (herein, EU pool control unit 106) and a graphics pipeline 108. The computational core 104 comprises a pool of multiple execution units to meet the computing requirements imposed by shader tasks associated with various shader programs, including a vertex shader, geometry shader, and/or pixel shader, processing data for the graphics pipeline 108. The graphics processor 102 further comprises a shared memory 112 for execution of threads by a general purpose (GP) shader, which is described in more detail below.

Figure 2:
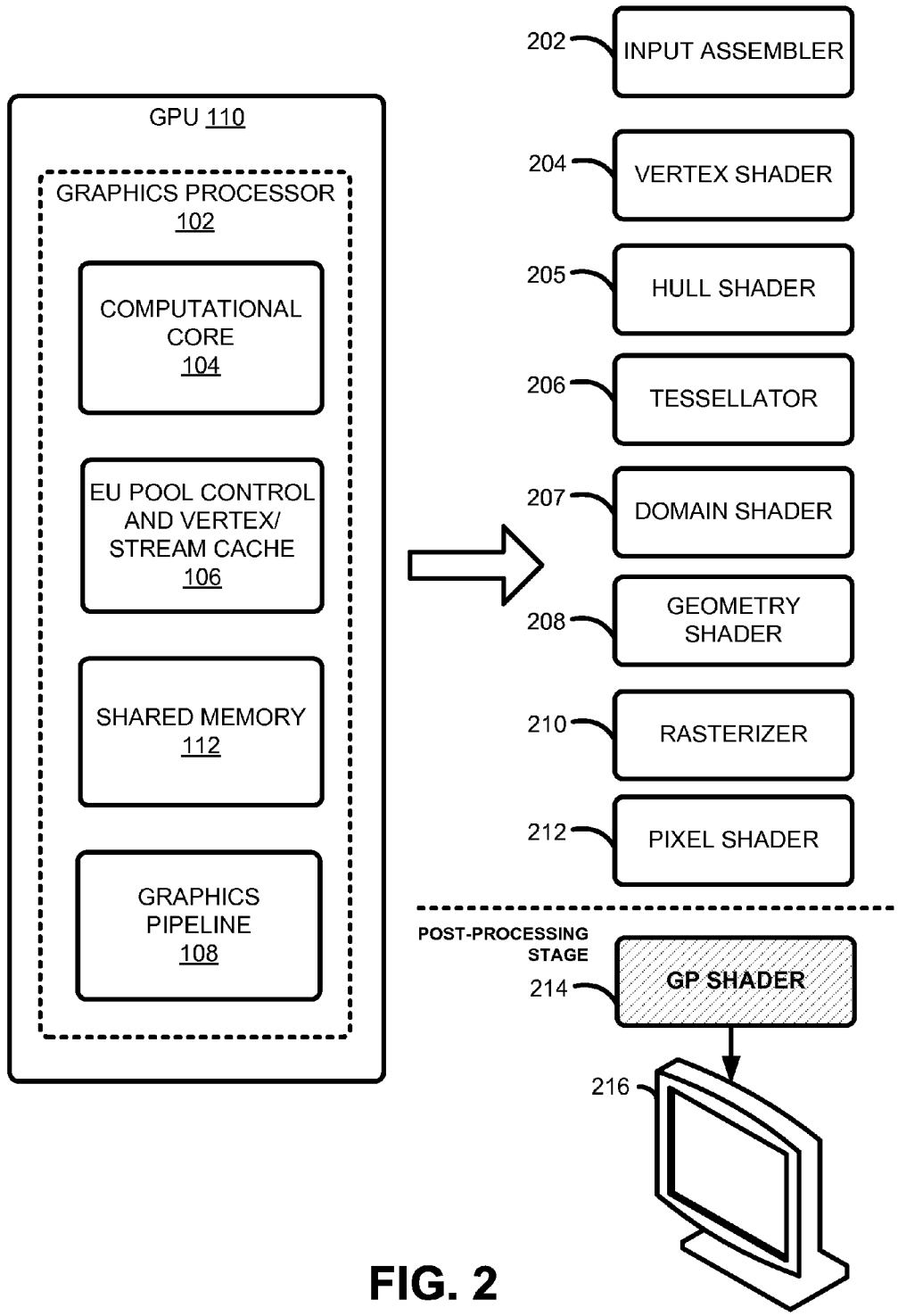
FIG. 2 is a block diagram that illustrates various components of the graphics pipeline shown in FIG. 1.

FIG. 2 is a block diagram that illustrates various components of the graphics pipeline 108 shown in FIG. 1 in which the shared memory 112 is utilized. Specifically, the components illustrated in FIG. 2 comprise components of the graphics pipeline 108 that cooperate, in whole or in part, with a GP shader 214. The graphics pipeline 108 comprises an input assembler 202, which fetches or generally receives vertex data from the system memory 101 using index buffers, and assembles primitives for further processing in the computational core 104. Note that system memory 101 may comprise local memory, among other memory subsystems such as a stream and vertex cache. The primitives, once assembled, are passed to the vertex shader 204.

The vertex shader 204 processes vertices by performing operations such as transformations, skinning, and lighting. The graphics pipeline 108 further comprises a hull shader 205, a tessellator 206, and a domain shader 207. Generally, these shaders 205, 206, 207 are utilized to enhance the smoothness of a given surface. In short, the hull shader 205 is directed to the selection of control points of a curve and is called for each patch, using the patch control points from the vertex shader 204 as inputs. Among other functions, the hull shader 205 computes tessellation factors, which are passed to the tessellator 206. This allows for adaptive tessellation, which can be used for continuous view-dependent LOD (level of detail). The data from the domain shader 207 is passed to the geometry shader 208.

The geometry shader 208 receives, as inputs, vertices for a full primitive, and is capable of outputting multiple vertices that form a single topology, such as a triangle strip, a line strip, point list, etc. The geometry shader 208 performs various functions, including shadow volume generation, and outputs information to the rasterizer 210, which performs clipping, primitive setup, and determines when and/or how to invoke the pixel shader 212. The pixel shader 212 is invoked for each pixel covered by the primitive that is output by the rasterizer 208. The GP shader 214 performs such post-processing as blur effects and is typically invoked as a plurality of threads, with the plurality of threads being divided into thread groups. Finally, geometry that represents surfaces (or volumes) of objects in a scene is translated into pixels (picture elements), stored in a frame buffer, and then displayed on a display device 216.

Figure 3A:
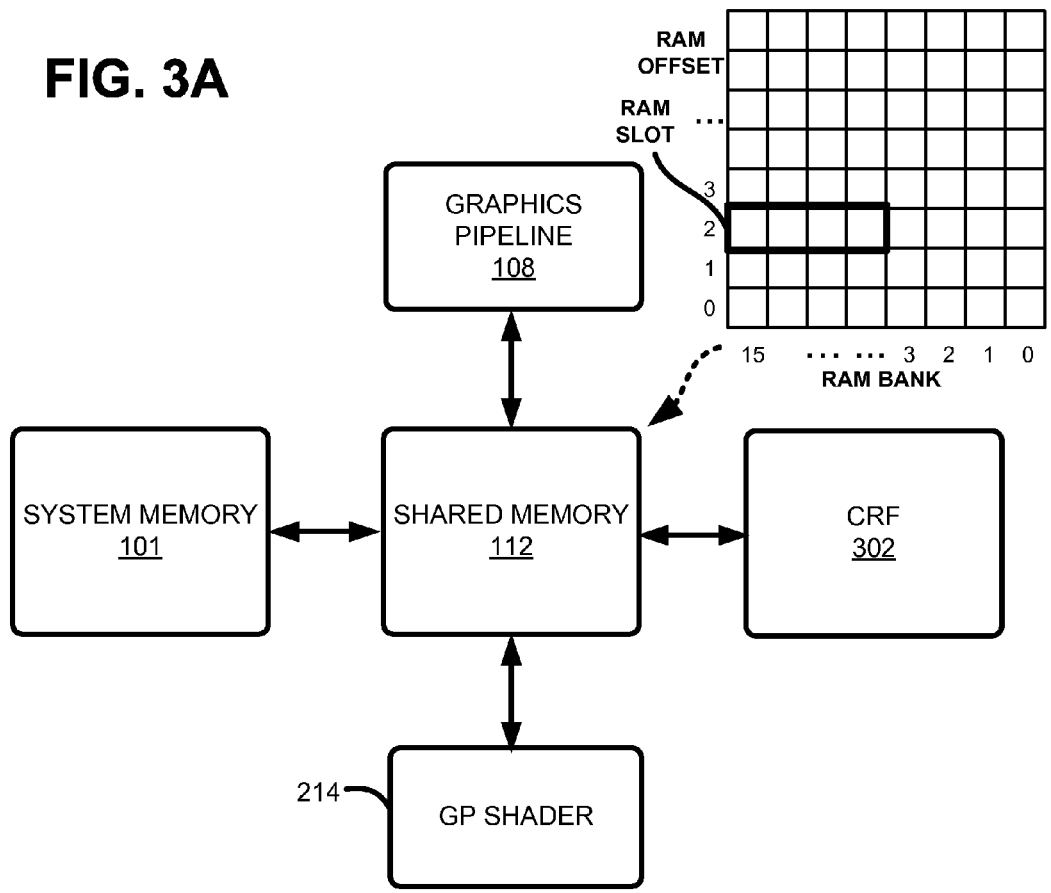
FIGS. 3A and 3B illustrate various components of the shared memory system in FIG. 1.

With reference to FIG. 3A, the shared memory 112 may be utilized to store data retrieved from system memory 101 for processing in the graphics pipeline 108, and similarly, data may be read from the shared memory 112 and stored back into system memory 101. For some embodiments, the shared memory system may be implemented as an execution unit (EU) shared memory buffer utilized by the general purpose (GP) shader 214. Instructions that define memory accesses may be invoked by an execution unit. A thread processing path includes a common register file (CRF) 302 and an EU data path. The EU data path includes arithmetic logic units (ALUs) (not shown). As shown in FIG. 3A, the share memory 112 may comprise a plurality of memory lanes, also referred to as RAM banks in the horizontal direction. For purposes of illustration, assume that the shared memory 112 comprises a total of 16 lanes numbered 0 to 15. The shared memory 112 also comprises a plurality of strides or RAM offsets in the vertical direction.

A particular EU instruction may be invoked which specifies a memory access comprising a read and/or a write operation to a particular address within the shared memory 112. The read/write address specified by the instruction points to the starting location for lane-based scalar data in the shared memory 112. For some embodiments, the address may comprise a RAM offset component and a RAM bank component. Consider, for example, an address 0b0110-0011. Depending on the particular implementation, this address may refer to a RAM offset of 6 and a bank value of 3 within the shared memory. For data that follows, the memory is traversed according to the lane offset being incremented by 1. Furthermore, for the example shared memory structure 112 shown, the RAM bank wraps around upon reaching bank 15, while the RAM offset may remain unchanged, depending on the particular memory access instruction being invoked. Various memory access schemes that employ wrap operations are described later.

Figure 3B:
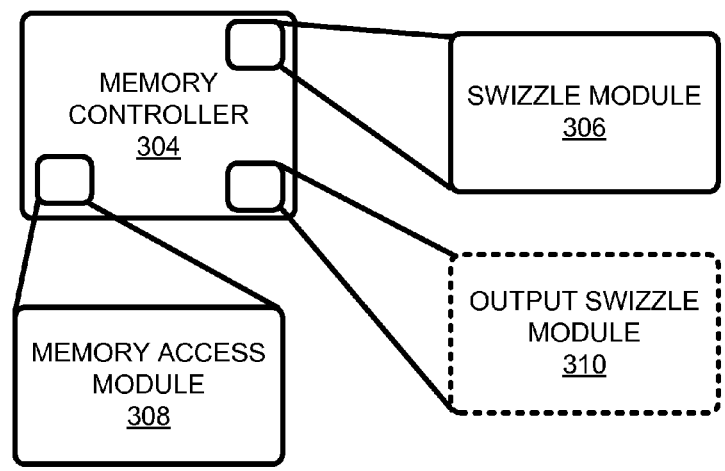
Figure 4:
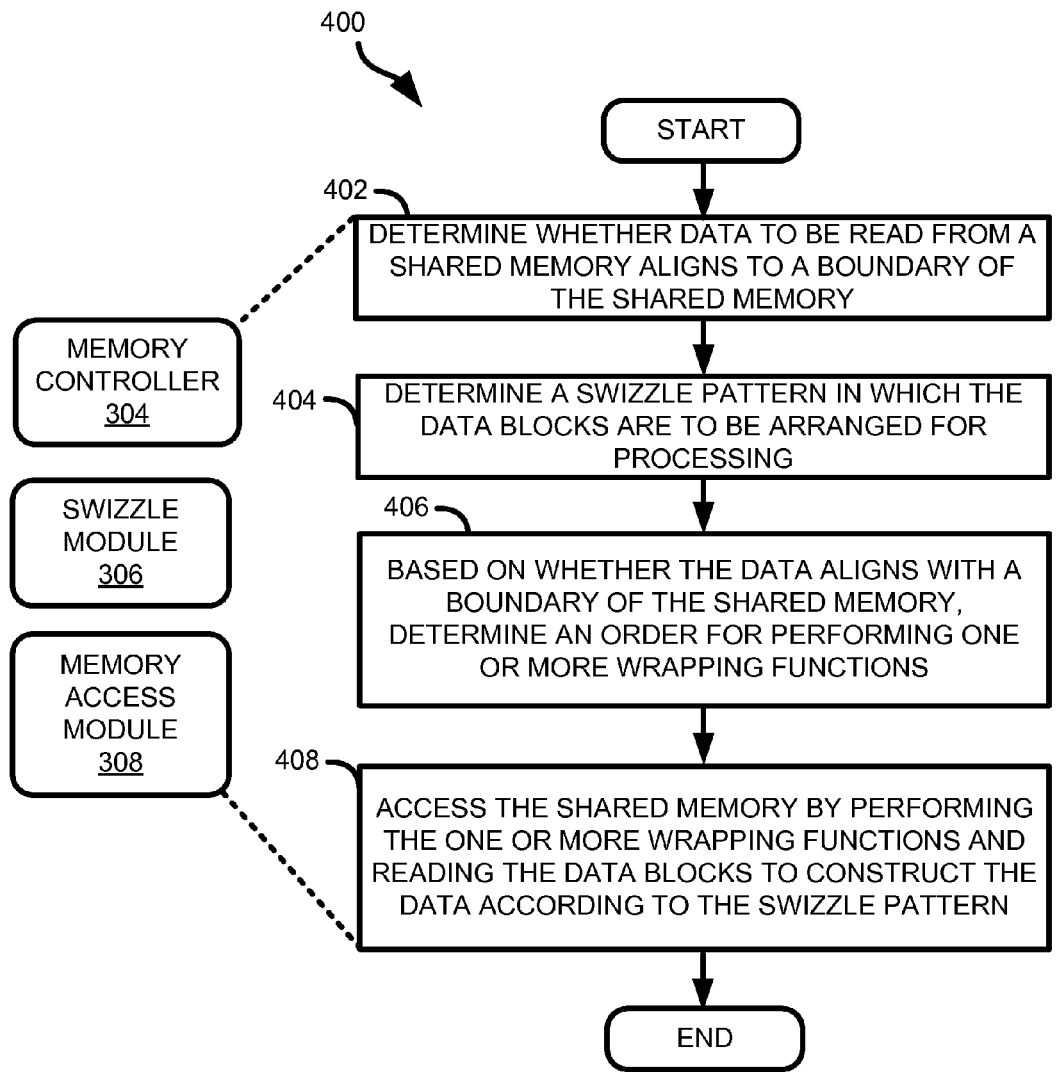
FIG. 4 is an embodiment for performing memory accesses with the shared memory of FIG. 1.

With reference to the block diagram in FIG. 3B and the flow diagram in FIG. 4, the shared memory system may comprise a memory controller 304 for controlling access to the shared memory 112 and for performing flow control. The memory controller 304 is configured to determine whether data to be read from the shared memory 112 or written to the shared memory 112 aligns to a particular pixel block or to the boundaries of the shared memory 112 (block 402 in FIG. 4). For some embodiments, the boundary of the shared memory 112 comprises a boundary defined by the size of the shared memory itself 112 and/or a boundary defined by pixel blocks within the shared memory 112. The memory controller 304 further comprises a swizzle module 306 configured to determine a swizzle pattern in which the data blocks are to be arranged for processing (block 404). Depending on how the data aligns with the boundaries of the shared memory 112, the swizzle module 306 is further configured to determine an order for performing one or more wrapping functions (block 406). The wrapping functions comprise a slot wrap function, a lane wrap function, and a stride wrap function, and the memory access performed may comprise any combination of these functions.

The memory controller 304 further comprises a memory access module 308 which performs the actual read/write operations with respect to the shared memory 112. The memory access module 308 is configured to access the shared memory 112 by performing one or more wrapping functions and reading the data blocks to construct the data according to the swizzle pattern determined by the swizzle module 306 (block 408).

Figure 5:
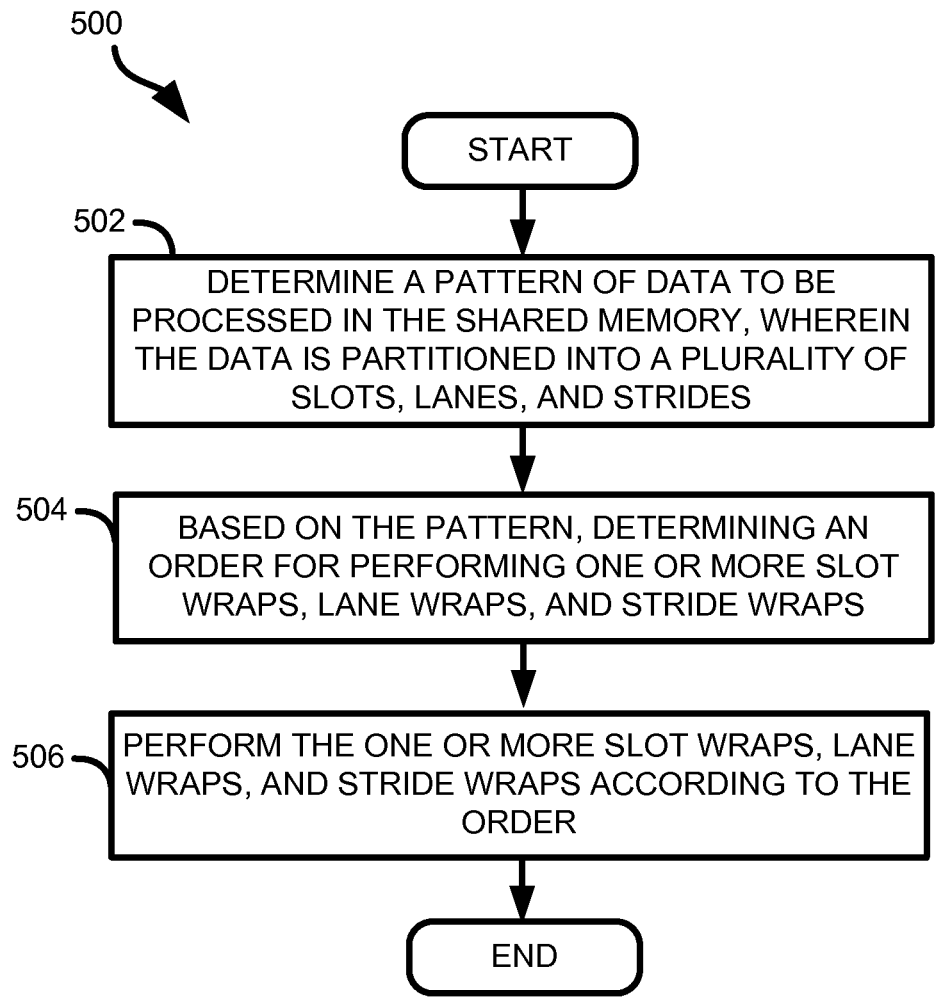
FIG. 5 is an alternative embodiment for performing memory accesses with the shared memory of FIG. 1.

FIG. 5 is an alternative embodiment for accessing the shared memory 112. In particular, FIG. 5 is a method for processing data in a shared random access memory in a graphics processing unit (GPU). Beginning with block 502, a pattern of data to be processed in the shared memory 112 is determined, where the data is partitioned into a plurality of slots, lanes, and strides. Based on the pattern, an order for performing one or more slot wraps, lane wraps, and stride wraps is determined in block 504. In block 506, the one or more slot wraps, lane wraps, and stride wraps are performed according to the determined order.

It should be noted that if embodied in software, each block described above may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Figure 6:
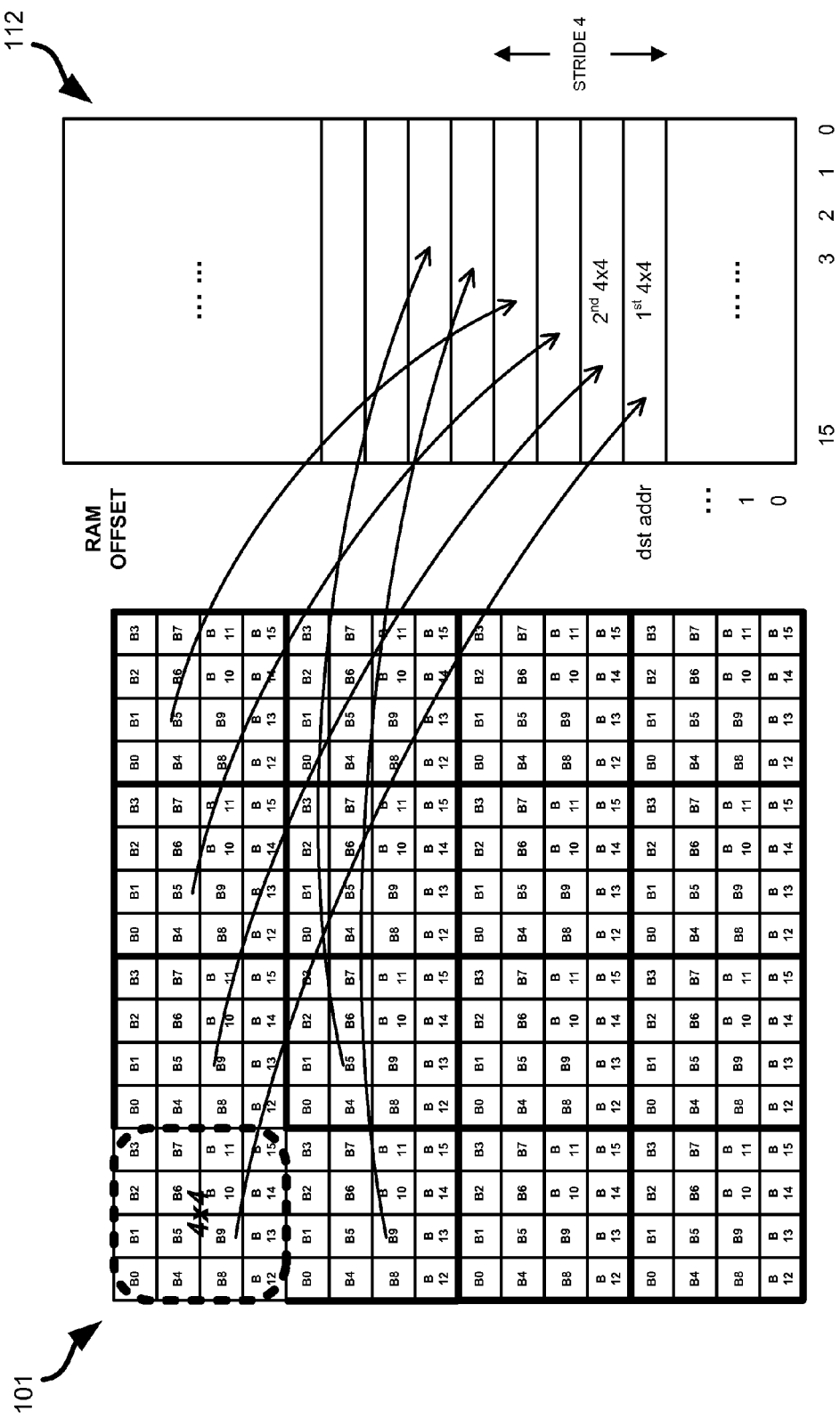
FIG. 6 illustrates the loading of an aligned 4×4 pixel block from system memory into shared memory.

FIG. 6 illustrates the loading of an aligned 4×4 pixel block from system memory 101 into shared memory 112. For data that aligns to one of the 4×4 pixel blocks shown, data can be loaded from system memory 101 into the shared memory 112 without the use of wrap operations. As shown in the nonlimiting example, system memory 101 comprises a 2-dimensional array of 4×4 pixel blocks. It should be noted that the data may be loaded from system 101 into shared memory 112 in not only 4×4 blocks, but also as 8×8 blocks, 12×12 blocks, or 16×16 blocks. For data blocks that align to a 4×4 block, no wrap operations are needed to transfer data from system memory 101 to the shared memory 112.

Figure 7:
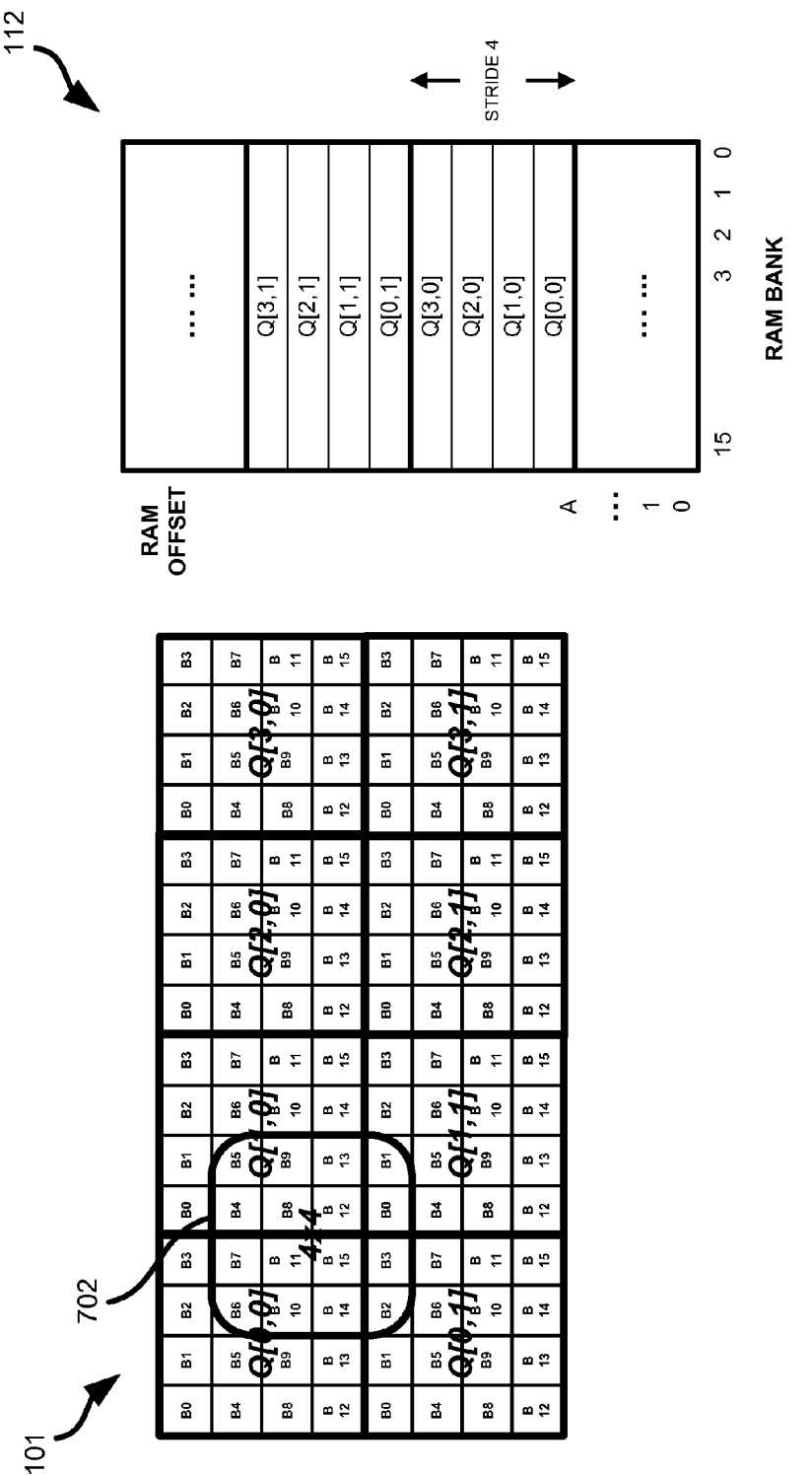
FIG. 7 illustrates the loading of an unaligned 4×4 pixel block from system memory into shared memory using a combination of slot wraps, lane wraps, and stride wraps.

FIG. 7 illustrates the loading of an unaligned 4×4 pixel block from system memory 101 into shared memory 112 using a combination of slot wraps, lane wraps, and stride wraps. As shown, system memory 101 may comprise a plurality of 4×4 pixel blocks designated as Q[0,0], Q[1,0], Q[2,0], Q[3,0], Q[0,1], Q[1,1], Q[2,1], and Q[3,1]. In the nonlimiting example, the unaligned data to be retrieved from system memory 101 and written to shared memory 112 does not fit within one of the 4×4 pixel blocks shown. In this regard, data may be read from or written to shared memory 112 as one 4×4 block at any nonaligned location. For some implementations, the address of the top-left pixel is specified, in addition to a 4-bit offset within the 4×4 pixel bock, where the 2 most significant bits represent a slot wrap value and where the 2 least significant bits represent a lane wrap value. For the example shown, data within the 4×4 block is accessed according to a particular order, beginning with pixel block Q[0, 0] at based address A, slot wrap 1, lane wrap 2 and stride 4 in the shared memory 112.

As one of ordinary skill will appreciate, the capability of transferring data between system memory 101 and shared memory 112 that are stored in unaligned memory locations may be useful for various graphics processing operations. With video decoding Inter-prediction for LUMA, for example, data is loaded in the shared memory 112 and processed, and a general purpose (GP) shader 214 loads reference data in pixels blocks. This may comprise, for example, 4×4 or 8×8 pixel blocks. For purposes of illustration, assume that the reference data comprises an 8×8 pixel block, which requires a 13×13 block of reference data based on motion vectors.

As described earlier and as illustrated in FIG. 7, an "unaligned" block refers to data that spans or wraps around the boundaries of the shared memory, whereas blocks that are "aligned" are those that fit in a contiguous area of the one or more pixel blocks within the shared memory. In some cases, the EU loads data that is aligned in memory, and 4×4 pixel blocks may be loaded in 16 banks across one RAM entry. A slot wrap and/or lane wrap operation may be applied during the loading process to ensure that any 8×8 block, 12×12 block, or 16×16 block can be accessed in both the row and column directions. For 4×4 block-based processing, however, there is generally no need to apply load/store slot/lane wraps if the data.

To further illustrate, consider a graphics operation where for each pixel within a pixel block (e.g., 4×4 or 8×8), half- and quarter-samples are calculated based on the neighboring pixels. In order to read the data in both row and column directions in a 8×8 or 16×16 pixel block, the shared memory is accessed through a series of data rotations and data shifts. Also the shared memory read/writes thereafter may use various shared memory read/write instructions to process the data in both the row and column directions. In this regard, data may be loaded from the device memory in the shared memory as 4×4, 8×8, 12×12, or 16×16 blocks.

Having described the basic framework for implementing a shared memory system, various exemplary methods for performing shared memory accesses are now described in more detail. In particular, various read/write operations incorporating a series of slot, lane, and stride wrap functions involving the shared memory 112 of FIG. 3A are described. It should be noted that for the shared memory operations described below, one or more wrap operations are utilized for reading or writing data according to a particular pattern. For some embodiments, the wrap operations comprise one or more of the following: a slot wrap, a lane wrap, and a stride wrap. Data can be read from the shared memory or written to shared memory according to a particular pattern by specifying a RAM offset value, slot wrap value, lane wrap value, and stride wrap value.

Referring back briefly to FIG. 3A, for exemplary embodiments, RAM banks that make up a shared memory 112 are grouped together into slots so that a given slot may comprise four RAM banks, for example, and the starting point of a shared memory operation is determined by the RAM offset and address provided by an instruction. Based on this, the next data to be accessed is determined by the lane wrap value, slot wrap value, and stride wrap value. Specifically, the process of performing one or more slot wraps, lane wraps, and stride wraps may be initiated by one or more instructions that specify slot values, lane wrap values, and stride wrap values. In this regard, flexibility in accessing the shared memory 112 by different components in a graphics pipeline is achieved by allowing different access modes to be specified. This may be accomplished by adjusting the order of wrapping based on the data pattern needed for processing. Reference will now be made to FIGS. 8-14, which illustrate various embodiments for utilizing slots wraps, lane wraps, and stride wraps to access the shared memory of FIG. 1.

Contiguous Read/Write Operation

One shared memory access technique is directed to contiguous read/write operations with respect to the shared memory 112. The read/write address provided by the EU instruction points to the start location of the lane-based scalar data in the shared memory 112. For contiguous shared memory read operations, the contents are read from a range of memory addresses spanning an effective address to an upper range, where the shared memory addresses are generally scalar values.

Figure 8:
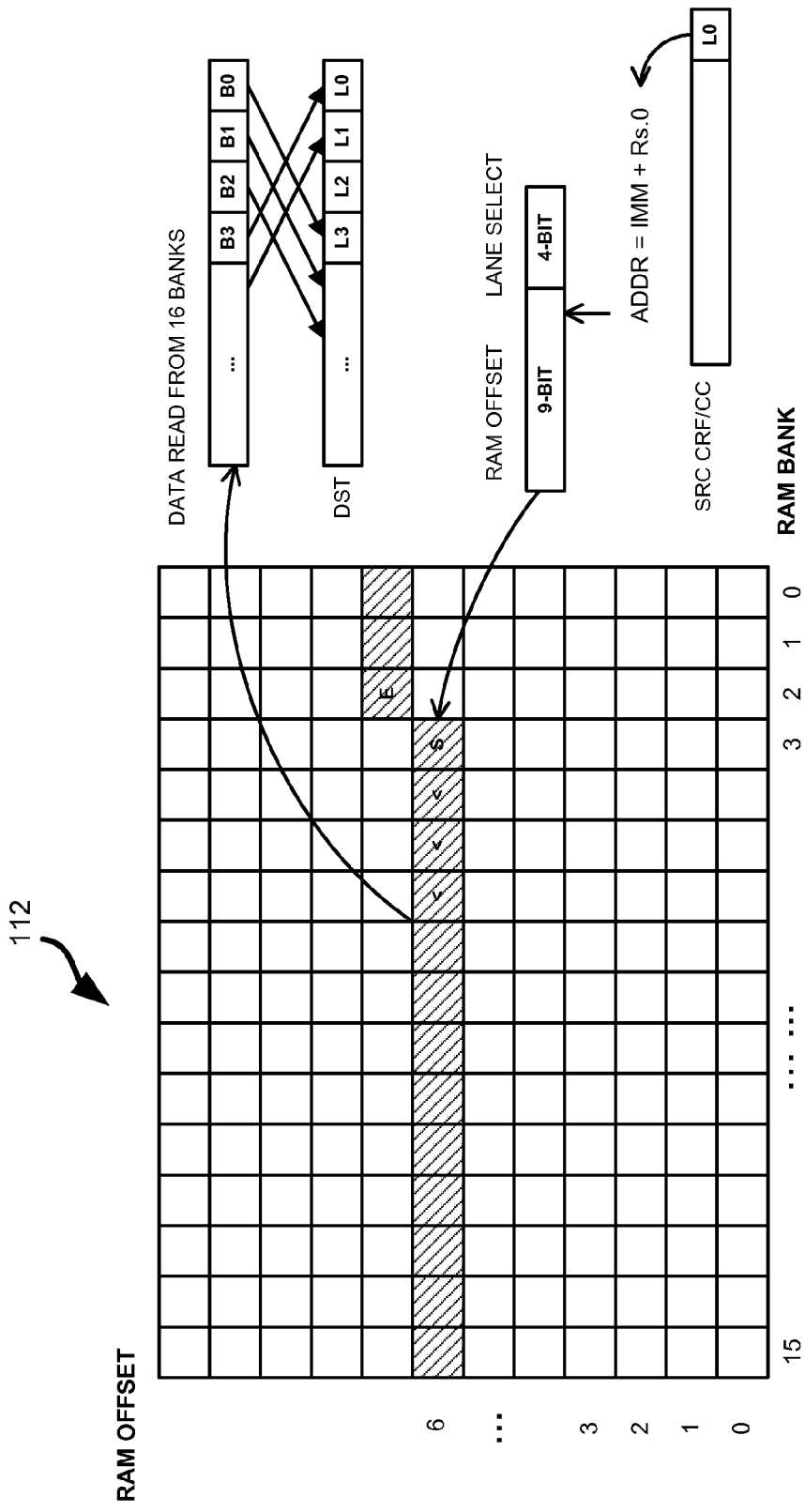
FIGS. 8-14 illustrate various embodiments for utilizing slots wraps, lane wraps, and stride wraps to access the shared memory of FIG. 1.

With reference to FIG. 8, the data being read comprises a plurality of data blocks and is stored in contiguous memory locations in the shared memory 112. For some implementations, the contiguous read operation may be invoked by an instruction, whereby operands correspond to the effective address and upper range referenced above. If the data is to be written to a CRF 302, the base address is located in the first valid lane from the least-significant lane of operand Rs1. For some implementations, the address is calculated as Thread Group Base Address+Rs1[0]+Immediate Address<<4+Bank. The read/write address provided by the EU instruction points to the starting location of the lane based scalar data in the shared memory 112.

As a nonlimiting example, consider the address 0b0110-0011, which points to RAM offset 6 and bank 3 in the shared memory 112. For every 32-bit scalar data that follows, the address (including the RAM offset and lane offset, both of which may be integer values) is incremented by 1. As shown in the nonlimiting example in FIG. 8, the 16 32-bit data from RAM offset 6 and bank 3 to 15, and from RAM offset 7 bank 0 to 2 will be fetched and written to the destination lane 0 to lane 15. For indexing involving the read/write contiguous operations, the address is provided in the source address 1, register lane 0, and is added to the immediate (IMM) field to generate the final address.

Read/Write Wrap Operation

Figure 9:
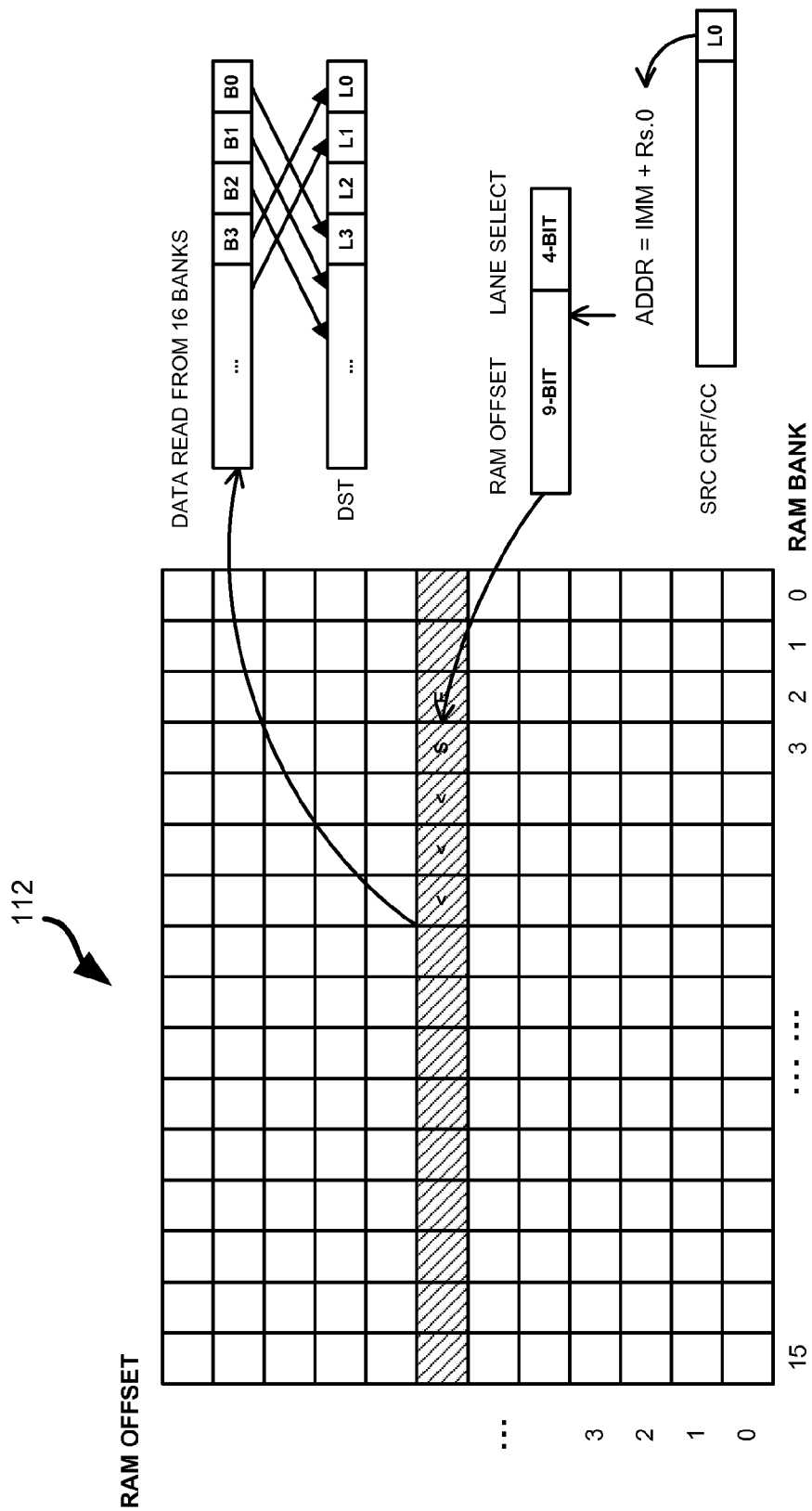

With reference to FIG. 9, another shared memory access technique is directed to read/write wrap operations, where the RAM offset remain constant. For such embodiments, the data to be read or written is arranged across multiple RAM banks or lanes within the shared memory 112. The read/write address is specified by an EU instruction and points to the starting location of the lane-based scalar data in the shared memory 112. For example, the address 0b0110-0011 points to RAM offset 6 and bank 3 in the shared memory 112. For every 32-bit scalar data that follows, the lane or bank offset is incremented by 1 and wraps around upon reaching the 16$^{th}$ RAM bank. For this read/write operation, the RAM offset remains unchanged. In the example shown in FIG. 9, the 16 blocks of 32-bit data span from RAM offset 6 and bank 3 to 15, and wraps around to banks 0 to 2. The data in these shared memory locations are fetched and written to destination lane 0 to lane 15. For some embodiments, the address is provided in the source 1 register lane 0, and is added to the IMM field to generate the final address.

Read/Write Slot Wrap Operation

Figure 10:
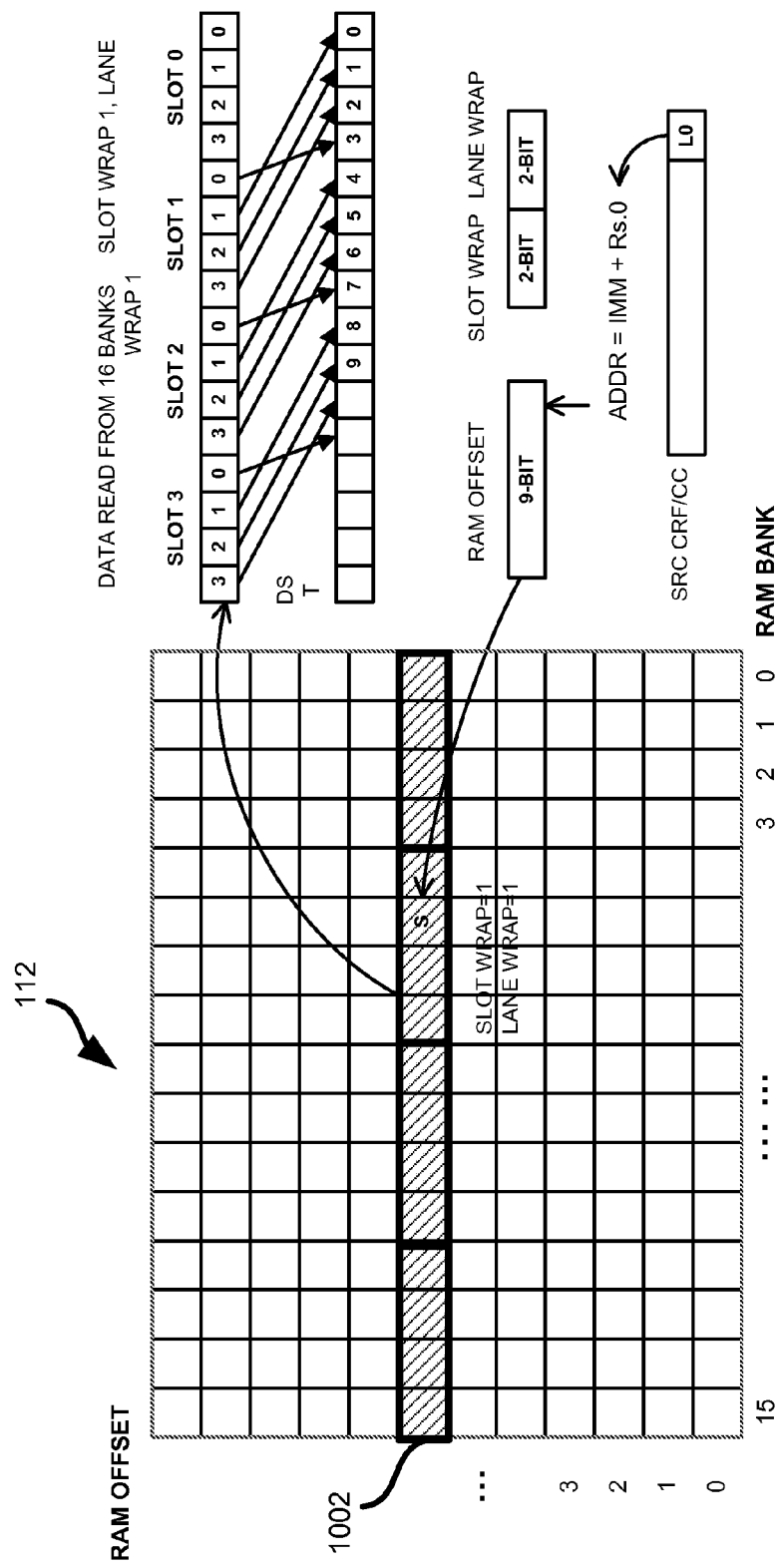

Reference is made to FIG. 10, which illustrates the read/write slot wrap operation. For read/write slot wrap operations, data is read from or written to the shared memory according to wrap operations from both a slot perspective and a lane perspective. Specifically, within a given slot, lane wraps are performed. For example, for a slot 1002 comprising 4 banks, a lane wrap comprises wrapping back around to the first lane upon reaching the fourth lane within a given slot. For example, a lane wrap involving a particular slot (e.g., slot 2) may comprise accessing lanes 3, 4 followed by lanes 1 and 2. Similarly, a slot wrap comprises wrapping back around to the first slot upon reaching the last slot in the shared memory 112. Referring to the illustration in FIG. 10, 4 slots are shown. Upon reaching the fourth slot 1002 to the left, the first slot is accessed next. A stride wrap comprises wrapping back around to the first stride or RAM offset upon reaching the maximum RAM offset in the shared memory 112. In accordance with one implementation, the write address is specified in the form of an operand by an EU instruction and points to the RAM offset in the shared memory 112.

For such embodiments, two swizzle fields are implemented to provide a 4-lane slot-based rotate shift amount (2 bits, 0~3) and the lane based within slot rotate shift amount (2 bits, 0~3) to provide flexibility in specifying a particular swizzle pattern for the data. A slot wrap value and lane wrap value of 1 results in the value "S" being written in the location shown in FIG. 10, assuming the RAM offset value is 6. Thus, for this shared memory operation, data is wrapped around in two respects— one relating to slot wraps, and the other relating to lane wraps. The resulting pattern in also shown.

Read/Write Wrap Slot Increment Operation

Figure 11:
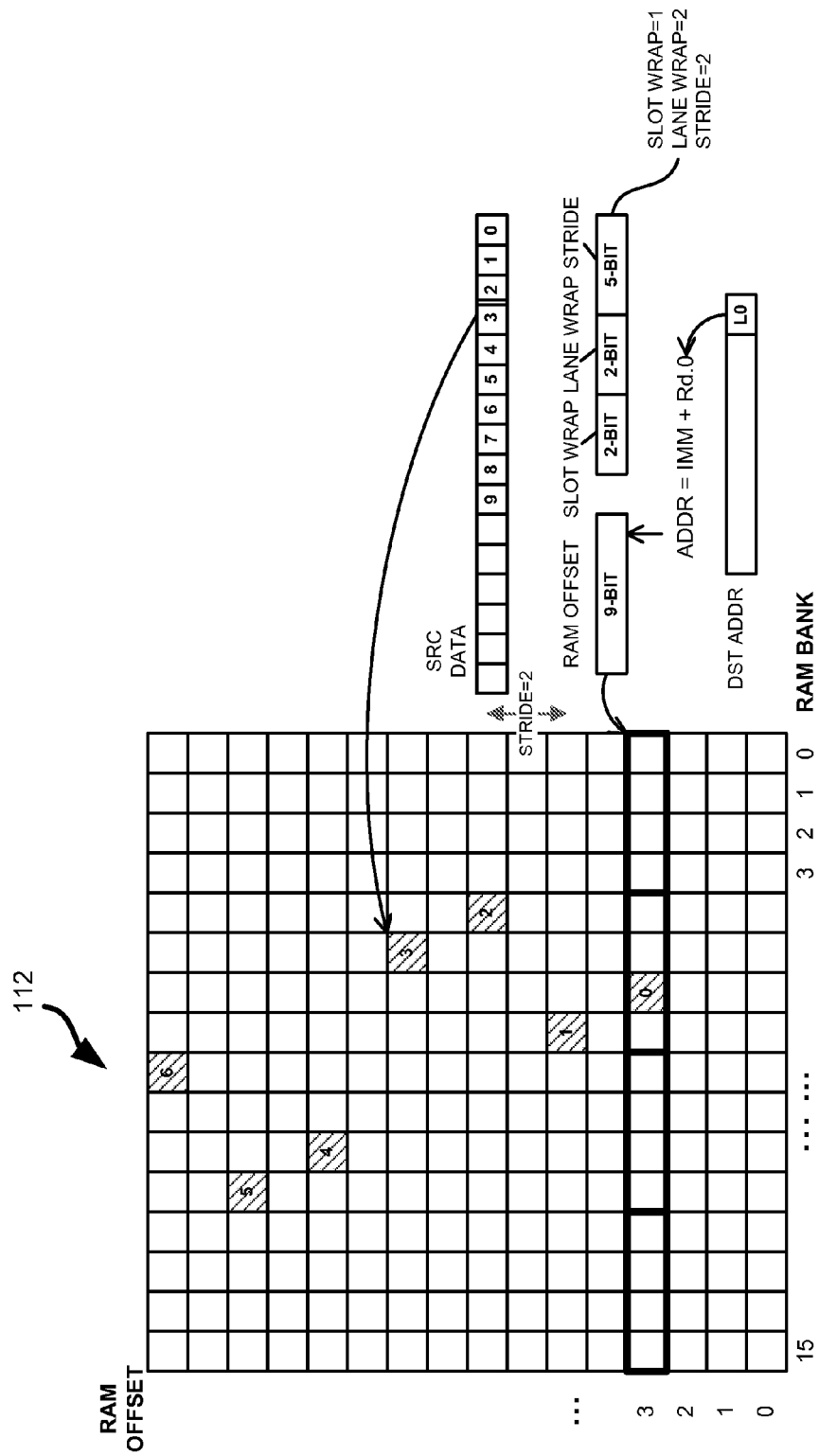

A variation of the read/write wrap slot operation involves an incrementing operation, also referred to herein as a read/write wrap slot increment operation. With reference to FIG. 11, the read/write address provided by the EU instruction points to the RAM offset in the shared memory. As with the read/write slot wrap operation above, two additional swizzle fields are incorporated to provide a 4-lane slot-based rotate shift amount (2 bits, 0~3) and the lane based within slot rotate shift amount (2 bits, 0~3). Furthermore, a stride value is also incorporated to allow access to the shared memory 112 in the RAM offset direction. For the nonlimiting example shown, a slot wrap value of 1, lane wrap value of 2, and a stride value of 2 have been specified. Namely, the RAM offset is increased by the amount specified by the stride wrap value for each scalar data value in the shared memory 112.

Read Wrap Slot Wrap Increment Operation

Figure 12:
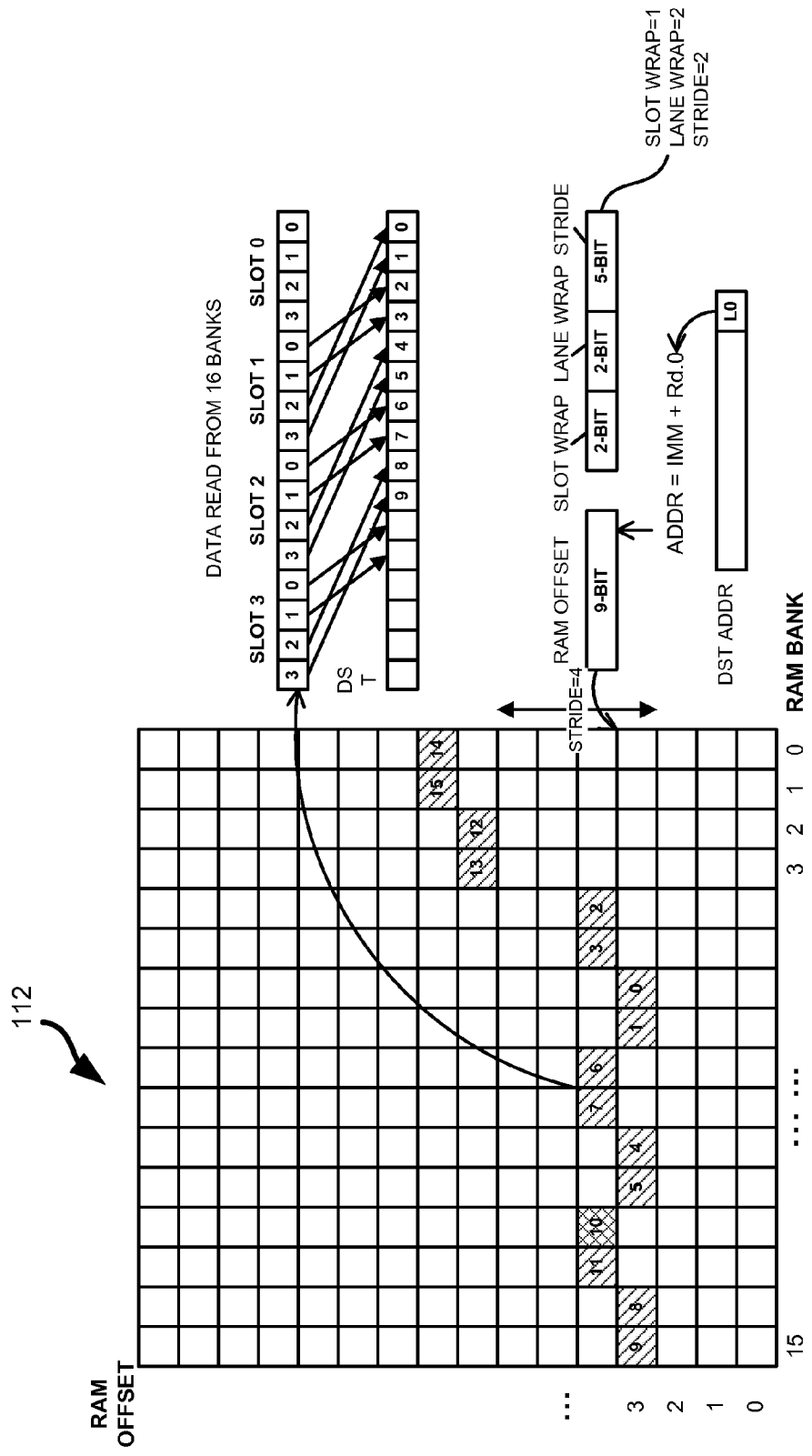

With reference to FIG. 12, a read wrap/slot-wrap operation with a slide increment is another operation that may be invoked for accessing the shared memory 112. For this operation, a read address is provided by an EU instruction which points to a RAM offset in the shared memory. Again, two swizzle fields are incorporated to provide the 4-lane slot-based rotate shift amount (2 bits, 0~3) and a lane-based rotate shift amount within a given slot (2 bits, 0~3). For this operation, a stride value specifies a RAM offset amount to traverse. With reference to the shared memory 112 in FIG. 1, assume for purposes of illustration that the shared memory 112 is modeled as a 2D array.

The stride value is utilized to allow reading or writing of data in the vertical or y-direction of the shared memory 112. It should be noted that this operation allows access to any nonaligned block of data. Accessing a nonaligned block may be involved, for example, when performing such processing as motion compensation. In this regard, a block of data such as a 4×4 block that does not fit within a contiguous portion of a pixel block within the shared memory 112 can be efficiently read or written to the shared memory without processing each data block individually in a successive fashion. Through the use of slot wrap operations, lane wrap operations, and stride wrap operations, data can be accessed within the shared memory. For the nonlimiting example shown, a slot wrap value of 1, lane wrap value of 2, and a stride value of 2 have been specified.

Figure 13:
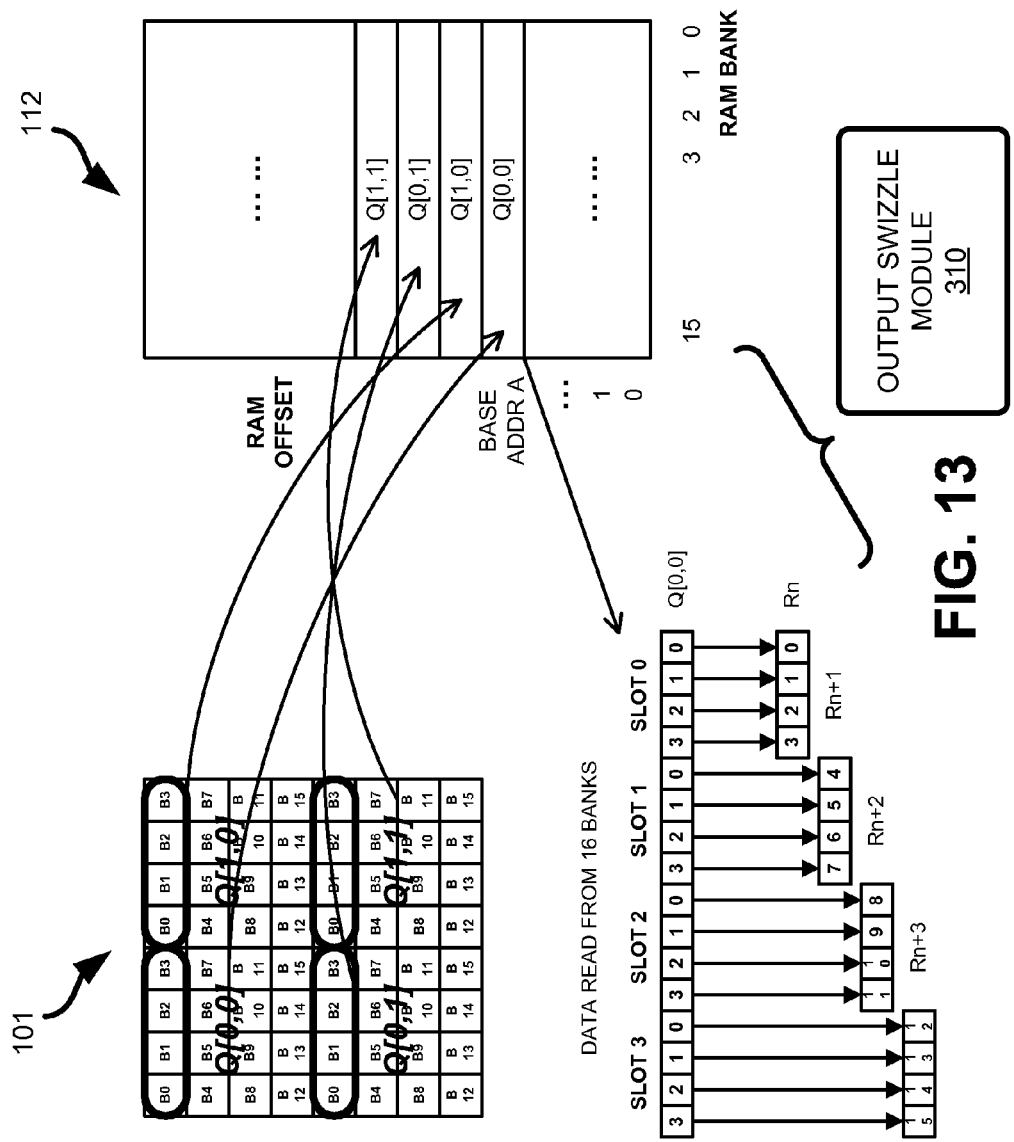
Figure 14:
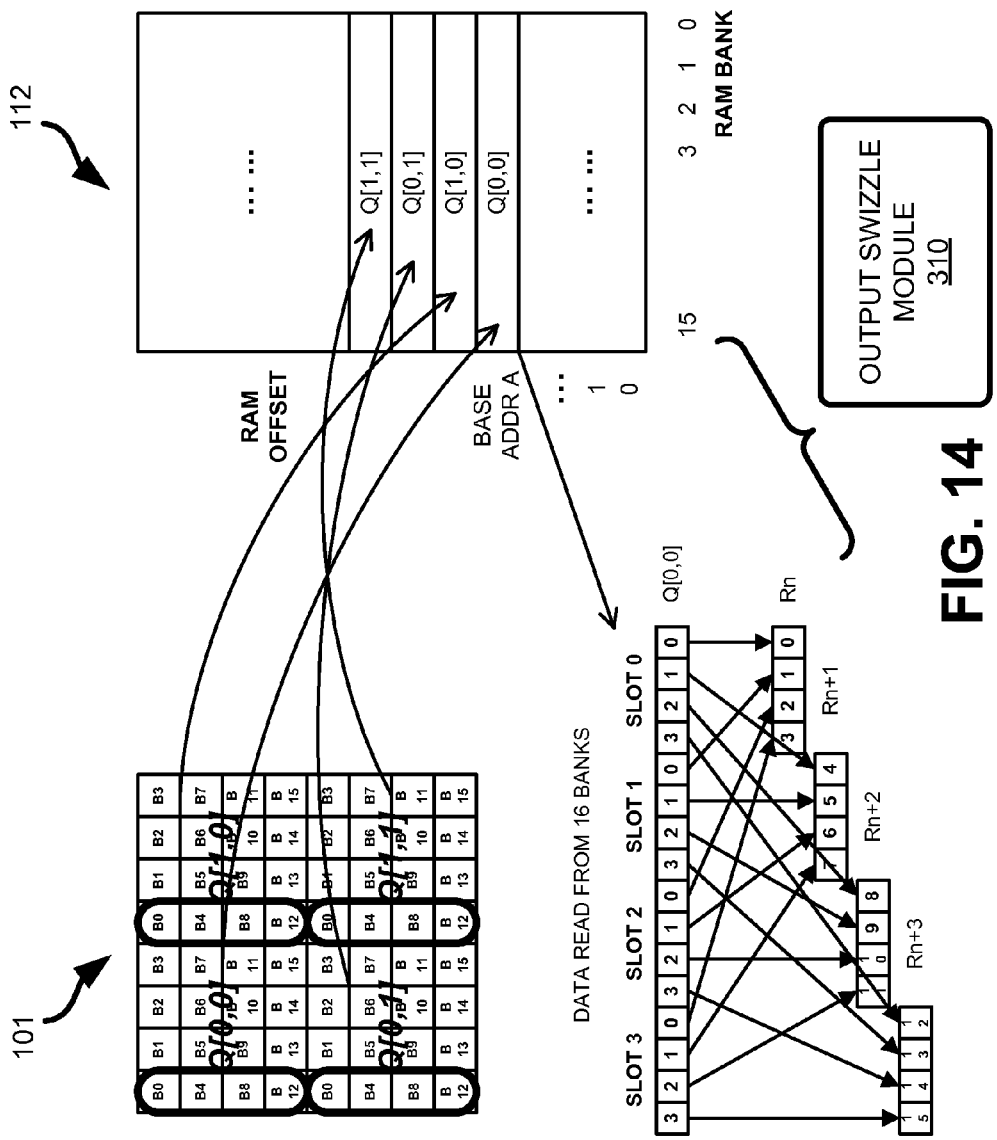

When data is read from the shared memory 112 and written to a common register file (CRF) 302, additional swizzling may needed to further arrange the data for processing in the CRF 302. In this regard, some embodiments further comprise an output swizzle module 310, as shown in FIG. 3B, that supports three swizzle modes—a vertical mode, a horizontal mode, and a horizontal swizzle mode. For such operations as video decoding transforms, it may be necessary to perform a 4×4 or 8×8 transform on the neighboring four 4×4 blocks. FIGS. 13-14 illustrate a horizontal operation and a horizontal swizzle operation performed by the output swizzle module 310.

As shown, data is loaded from system memory 101 and into shared memory 112 as a 1D array comprising aligned 4×4 data block. Data may be read from shared memory 112 as one aligned 4×4 block by configuring the output swizzle module 310 to operate in horizontal mode. The data is then written into the CRF 302. In this regard, the output swizzle module 310 allows any four 4×1 or 1×4 block to be retrieved and written to the CRF 302 without a data conflict. Similarly, any two 8×1 or 1×8 block may be retrieved without conflict. Referring now to FIG. 14, a horizontal swizzle mode may be supported by the output swizzle module 310 whereby the data read from system memory 101 and stored into the shared memory 112 undergoes a horizontal swizzle prior to being written to the CRF 302.

Where any of the components described comprises software or code, the same can be embodied in any computer-readable medium for use by or in connection with an instruction execution system such as, for example, a processor in a computer system or other system. In the context of the present disclosure, a computer-readable medium can be any tangible medium that can contain, store, or maintain the software or code for use by or in connection with an instruction execution system. For example, a computer-readable medium may store one or more programs for execution by a processing device such as the graphics processor 102 in FIG. 1.

The computer readable medium can be, for example, but not limited to, an electronic, magnetic, optical, or semiconductor system, apparatus, or device. More specific examples of the computer-readable medium may include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for accessing a shared memory in a graphics processing unit (GPU), comprising:
   determining whether data to be read from a shared memory aligns to a boundary of the shared memory, wherein the data comprises a plurality of data blocks, and wherein the shared memory comprises a plurality of banks and a plurality of offsets;
   determining a swizzle pattern in which the data blocks are to be arranged for processing;
   based on whether the data aligns with a boundary of the shared memory and based on the determined swizzle pattern, determining an order for performing one or more wrapping functions; and
   accessing the shared memory by performing the one or more wrapping functions and reading the data blocks to construct the data according to the swizzle pattern.

2. The method of claim 1, wherein the shared memory comprises a plurality of banks and a plurality of offsets.

3. The method of claim 2, wherein the plurality of banks are grouped into slots, wherein the plurality of slots are accessed according to slot values.

4. The method of claim 3, wherein the plurality of offsets are traversed according to stride values.

5. The method of claim 3, wherein accessing the shared memory by performing the one or more wrapping functions comprises performing one or more of:
   a slot wrap;
   a lane wrap; and
   a stride wrap.

6. A shared memory system, comprising:
   a shared memory coupled to a compute shader and components in a graphics processing unit (GPU) pipeline; and
   a memory controller for determining whether data to be accessed with respect to the shared memory aligns to a boundary of the shared memory, the memory controller further comprising:
      a swizzle module for determining a pattern in which data comprising a plurality of blocks are to be arranged; and
      a memory access module for accessing the shared memory according to the pattern, wherein the memory access module accesses the shared memory using one or more wrapping operations.

7. The system of claim 6, wherein the boundary of the shared memory comprises one of:
   a boundary defined by the size of the shared memory; and
   a boundary defined by pixel blocks within the shared memory.

8. The system of claim 6, wherein the shared memory comprises a plurality of horizontal banks and a plurality of vertical offsets.

9. The system of claim 6, wherein the plurality of horizontal banks are partitioned into slots, wherein each slot comprises a predetermined number of horizontal banks.

10. The system of claim 6, wherein the plurality of offsets are partitioned into strides.

11. The system of claim 6, wherein the memory access module accesses the shared memory using one or more wrapping operations by performing the wrapping operations according to an order, wherein the order is based on the pattern of data.

12. The system of claim 6, wherein the wrapping operations comprise:
   a lane wrap;
   a slot wrap; and
   a stride wrap.

13. The system of claim 6, wherein accessing the shared memory comprises one of reading from the shared memory and writing to the shared memory.

14. The system of claim 6, wherein the memory access module is further configured to write data read from the shared memory to a command register file (CRF), wherein upon writing the data to the CRF, the swizzle module performs a swizzle function on the data.

15. The system of claim 14, wherein the swizzle function comprises one of:
   a horizontal swizzle operation; and
   a vertical swizzle operation.

16. A method for processing data in a shared random access memory in a graphics processing unit (GPU), comprising:
   determining a pattern of data to be processed in the shared memory, wherein the data is partitioned into a plurality of slots, lanes, and strides;
   based on the pattern, determining an order for performing one or more of: slot wraps, lane wraps, and stride wraps; and
   performing the one or more slot wraps, lane wraps, and stride wraps according to the order.

17. The method of claim 16, further comprising determining whether the data on which the memory operation is to be performed in the shared memory aligns to a boundary of the shared memory.

18. The method of claim 17, wherein the one or more slot wraps, lane wraps, and stride wraps are performed according to the order in response to determining that the data is not aligned to a boundary of the shared memory.

19. The method of claim 17, wherein the boundary of the shared memory comprises one or more of:
   a boundary defined by the size of the shared memory; and
   a boundary defined by pixel blocks within the shared memory.

20. The method of claim 16, wherein performing the one or more slot wraps, lane wraps, and stride wraps according to the order is initiated by one or more instructions specifying slot values, lane wrap values, and stride wrap values.

* * * * *